June 26, 1962    R. T. H. COLLIS ETAL    3,041,604
CORNER REFLECTOR FORMED OF TAUT FLAT REFLECTING ELEMENTS
WITH RESILIENT PERIPHERAL TENSION FRAMES
Filed Aug. 15, 1957    3 Sheets-Sheet 1
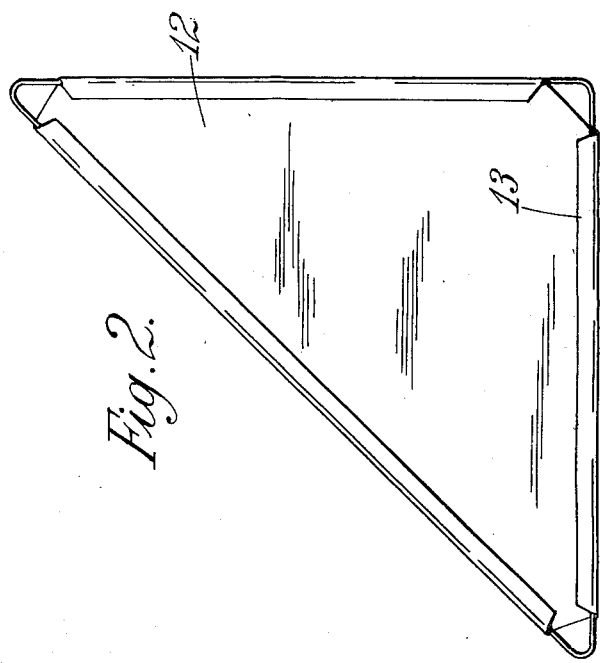
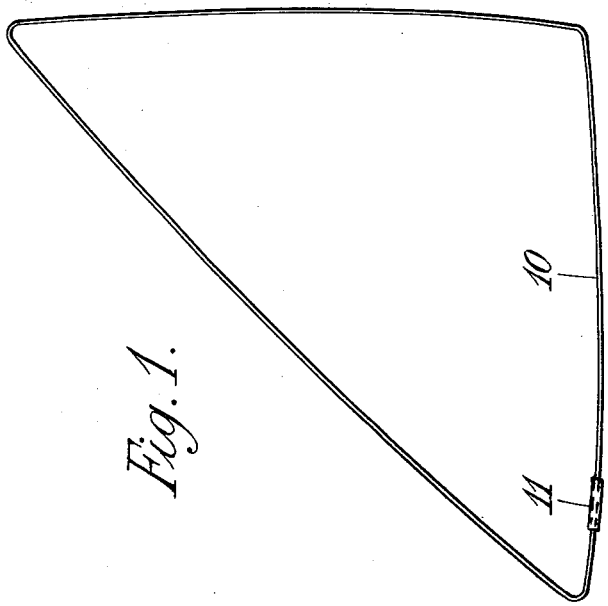

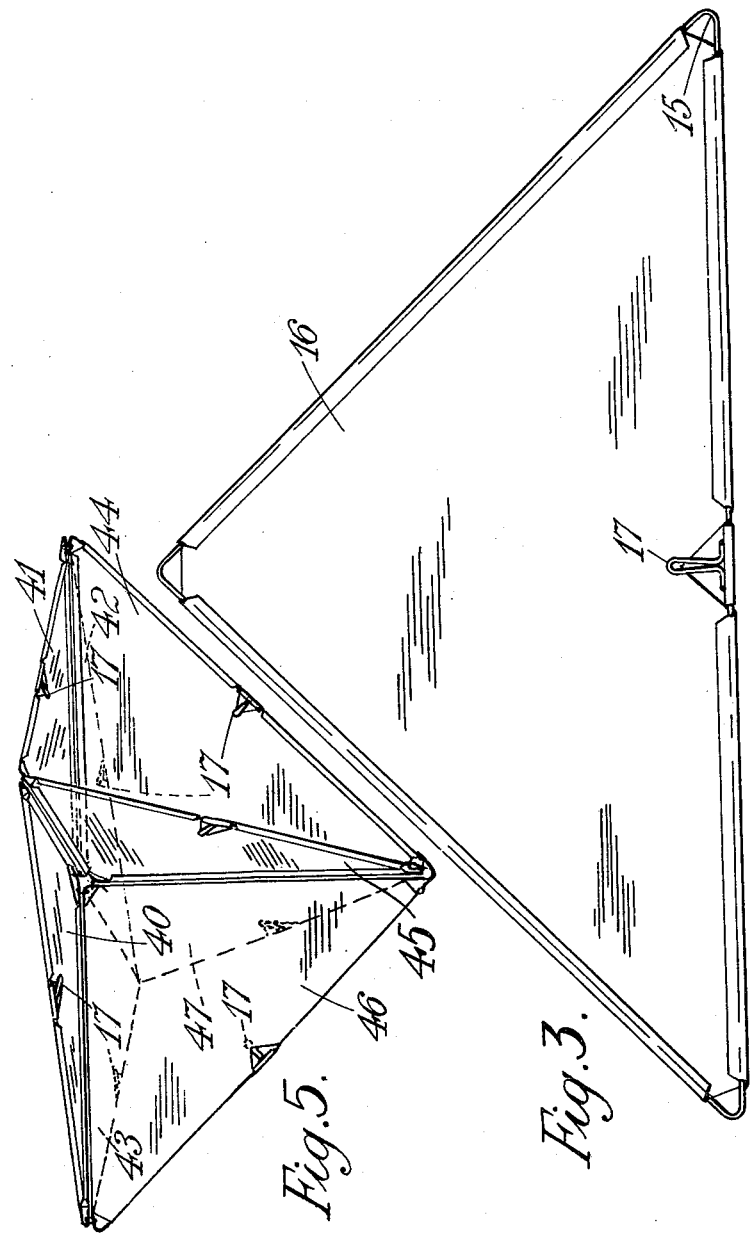

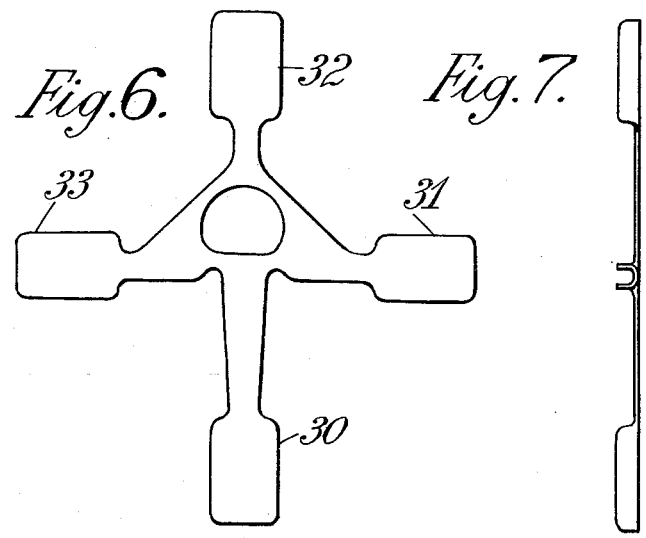
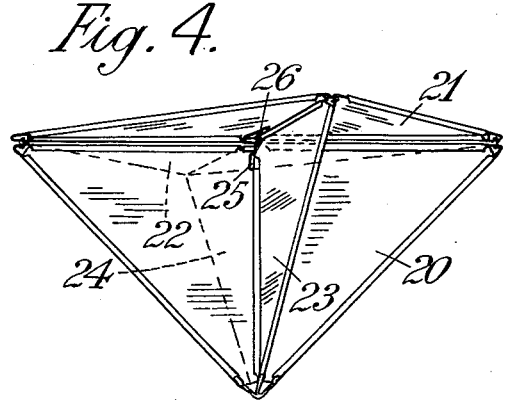

United States Patent Office 3,041,604
Patented June 26, 1962

3,041,604
CORNER REFLECTOR FORMED OF TAUT FLAT REFLECTING ELEMENTS WITH RESILIENT PERIPHERAL TENSION FRAMES
Ronald Thomas Harry Collis, Trevor William Welch, and Michael John Cowlard, all of London, England, assignors to The Decca Record Company Limited, London, England, a British company
Filed Aug. 15, 1957, Ser. No. 678,407
5 Claims. (Cl. 343—18)

This invention relates to corner reflectors that is to say, to devices for reflecting incident radio waves from a radar transmitter back in the direction from which they come.

It is well known that if radio waves are directed into the internal angle formed by three mutually orthogonal reflecting planes which intersect at a point and which have dimensions large compared with the wavelength, then the incident waves will be reflected back in the direction from which they came. This property is made use of in corner reflectors for reflecting back signals from a radar transmitter so as to give a response at the radar receiver. For reflecting incident signals from any incident direction, a reflector having eight such reflecting corners with common apices is employed. An octahedral reflector may be considered as being formed of three mutually orthogonal reflecting planes each extending symmetrically about their common point of intersection. For some purposes, however, e.g. when incident signals will be received only from above or only from below the horizontal, a reflector having only four reflecting corners may be employed and such a reflector will be referred to hereinafter as a "four-corner" reflector.

Corner reflectors are used, for example, on buoys or the like to assist in marine navigation and on balloons for wind-determining. Particularly for balloon corner reflectors, it is very desirable that they should be of light weight and economical to manufacture and assemble.

Heretofore balloon corner reflectors have generally been made either of a number of rigid planar frames, to each of which is attached a sheet of reflecting material such as metal foil or metalized paper or metalized mesh, which frames are tied together to assemble the reflector, or as a collapsible framework having four radial arms on a central support rod, which arms can be opened up and locked in position in a manner similar to an umbrella construction. The first of these types suffers from the disadvantage that the reflecting surfaces are seldom exactly flat because of the difficulty of securing the foil or mesh on a rigid frame so that it is taut. Furthermore the frames have to be light and are liable to distortion in handling so that the foil or mesh may become slack. The "umbrella" type of corner reflector can only be used for four-corner and not for octahedral corner reflectors. Furthermore it has to be very accurately constructed since the four radial arms have to tension eight sheets of the reflecting material. This latter type of corner reflector is therefore relatively expensive to manufacture. A further disadvantage of this latter type of corner reflector is that each sheet of reflecting material is tensioned between only two rigid members. A sheet, to be held flat, must be tensioned around all its periphery and hence a tensioning wire has to be provided to form a third side for each sheet which is of substantially triangular form. When the sheet is in tension, this wire assumes a catenary form which reduces the effective area of the plane in the reflector. It is an object of the present invention to provide an improved form of corner reflector which can obviate these drawbacks.

According to this invention, a corner reflector is formed of a number of separate frames of resilient material, each frame being arranged, by its resilience, to maintain in tension a sheet of flexible reflecting material secured on the frame. By maintaining each sheet under tension by the resilience of the frame in this manner, the sheet can be maintained taut even if the frame is subjected to other stresses.

Conveniently each frame is of right-angled isosceles triangular form when tensioned by the sheet secured on it and, for this purpose, the frames may be made of wire bent into triangular form with outwardly bowed sides which are subsequently pulled straight by securing the sheet tautly on the frame. It is found that duralumin wire is suitable for this purpose and the frame may be formed by bending a suitable length of wire into generally triangular form with sides of the requisite lengths and then joining the ends, the angles being made greater than the 90° and 45° ultimately required.

In a typical case where the sides of the frame are of the order of two to three feet long, these sides might be bowed out of straight by a distance of the order of half an inch.

A wire frame as described above may conveniently be made by suitably bending a single length of wire and securing the two ends together e.g. with a butt weld or by crimping in a tube.

The aforementioned flexible reflecting material may comprise metalized mesh or metal foil or metalized paper.

A corner reflector may be formed from a number of similar frames and conveniently these frames are clipped together by clips. Such clips may be metal clips bent around the wires or spring clips made of resilient sheet material bent into a shape to embrace two, three or four of the wires forming the frame according to the number of frame members to be secured together by the clip.

According to a further feature of the invention a corner reflector may be formed of a plurality of reflecting surfaces mounted on triangular frames of right angled isosceles form, the corner reflector being formed of frames of two sizes of which the larger size has its shorter sides substantially equal in length to the hypotenuse of the smaller frames. By using two sizes of frame in this manner, a further having of weight is obtained compared with the use only of frames of a single size. For example, an octahedral corner reflector may be formed of only four of the larger frames together with four of the smaller frames. If only one size of frame had been used, it would be necessary to employ twelve such frames and it will be appreciated that, since the greater part of the weight is in the frame and not in the sheet material secured to the frame, a large size frame will weigh less than two frames of half its size. Similarly, a four-corner reflector may be made from three large frames together with two small frames whereas eight frames would be required if only a single size frame were employed. In such an arrangement spring clips may be used as previously described. However, by the use of two sizes of frames it will be appreciated that at certain of the apices of the corner reflector, the smaller frames would not have any part of their periphery lying parallel to part of a larger frame and to effect a rigid joint at these apices the frames may be secured together either by suitably shaped clips or by link pieces formed of short lengths of wire having a 45° bend, which link pieces may be secured with one arm to the larger frame and with one arm to a smaller frame or frames by means of clips such as has previously been described. Furthermore, particularly in a four-corner reflector, it may be desirable to provide some means by which the smaller frames may be located at the centre of the reflector where they meet the centre of the longer sides of the larger frames. Such locating means would also assist in the assembly of a corner reflector from the frames. For this purpose the longer side of the larger frames may be provided with a projecting part projecting from the centre of the long side for a short distance towards the opposite apex of the frame. Such a projection may conveniently be formed either by attaching, e.g. soldering, the necessary projecting part to the triangular frame or by bending the wire of the frame so as to have a short bight with two parallel closely adjacent sides. The projection may be formed on a tube which is crimped around the two ends of the wire forming the triangular frame to secure those ends together.

As previously indicated the frames may be covered with mesh or with foil or with metalized paper and the use of an assembly of frames as described above for forming a corner reflector facilitates the assembly of a reflector in which different reflecting surfaces are used in the different planes as might sometimes be desirable. Airborne corner reflectors, for example, are lifted relatively rapidly by the balloon and in order to minimise air resistance, it is usually preferable to have the horizontal portions formed of mesh whereas a better and cheaper reflecting surface may be obtained by using foil or metalized paper and the arrangement described above permits of the choice of reflecting surfaces according to the conditions of use of the reflector and the results required.

Instead of using wire as described above for the frames, it may, in some cases, be preferred to use a resilient synthetic plastic which could be moulded to the required form such that the reflecting material is tensioned when the frame is forced into the final required shape.

According to a further feature of the invention, a method of making a frame for a corner reflector such as has been described above comprises the steps of forming a length of resilient wire into a generally triangular shape with outwardly bowed sides and securing flexible reflecting material in position on the wire to hold the latter in tension so that the wire forms a straight-sided triangle. The frame may be formed in a jig comprising a base plate with upstanding parts, e.g. three upstanding straight ridges, adapted to embrace a triangular frame holding it in the required straight sided shape. For example, a wooden board may be used with three pieces of beading secured to it, one of the pieces being removable so that the assembled frame may be moved out sideways. The sheet of reflecting material would be placed on this jig and the frame then put into the jig on top of the reflecting material which is thus pushed down onto the base plate. The edges of the reflecting material are then folded back and secured e.g. by adhesive onto the main part of the material so that this material will be under tension as soon as the frame is released from the jig due to the resilience of the bowed sides of the frame.

In the following description reference will be made to the accompanying drawings in which:

FIGURE 1 shows a frame for a corner reflector before being covered with flexible reflecting material;

FIGURE 2 shows the frame of FIGURE 1 after it is covered;

FIGURE 3 is a view similar to FIGURES 1 and 2 of a larger sized frame;

FIGURE 4 is a perspective view of a small four-corner reflector;

FIGURE 5 is a perspective view of a larger four-corner reflector;

FIGURE 6 is a plan view of a blank for forming a clip; and,

FIGURE 7 is an end view of the clip blank in FIGURE 6 after a forming operation.

Referring to FIGURES 1 and 2, there is shown a frame formed of duralumin wire 10 bent into a generally triangular form with rounded corners and bowed sides. In the particular embodiment illustrated in FIGURES 1 and 2, the shorter sides of the frame are approximately 18" long, and the frame has rounded corners of about ¼" radius. The sides are outwardly bent for example in a jig to bow the sides outwardly by an amount of the order of ½". The two ends of the wire are joined together near one corner by crimping a tube 11 around the ends. The triangular-formed wire 10 is covered with a sheet of flexible reflecting material, typically a sheet of metalized paper 12 as shown in FIGURE 2, this paper being arranged to hold the wire under tension so that the sides are maintained straight. Conveniently this covering of the frame with the flexible reflecting material is done by the use of a jig comprising a wooden base board with three pieces of straight beading mounted on the board to embrace the frame in the final desired form. The metalized paper is put over this jig and the wire frame is then forced into the jig and the edges of the paper turned over as indicated at 13 and secured down on to the main portion of the paper by adhesive so as to hold the wire under tension. The reflecting material is thus held taut and so a smooth reflecting surface is obtained. It will be noted that the paper is cut away at the three corners so as to expose the wire 10 to permit of frames being clipped together as described later.

FIGURE 3 illustrates a larger size of frame which, as described later, is used co-operatively with the frame of FIGURES 1 and 2. The frame in FIGURE 3 is formed in a similar manner to that of FIGURES 1 and 2, with a wire 15 bent into triangular form with bowed sides and maintained under tension with a sheet of flexible reflecting material such as metalized paper 16. As seen in FIGURE 3, the ends of the wire 15 forming the frame are joined together by crimping in a tube at the middle of the longer side and at this point there is secured, by soldering or the like, a small projection 17 formed of wire, which projection extends from the middle of the longer side towards the opposite apex. This projection could alternatively be formed by forming a bight in the wire 15. In the frame of FIGURE 3, the flexible reflecting material is cut away not only at the corners but adjacent the projection 17 to permit of the attachment of clips to the wire 15 at this point and to the projection 17. The frame of FIGURE 3 is made such that the distance from the centre of the longer side to the opposite apex is equal to the length of the shorter side of the frame of FIGURES 1 and 2.

One assembly of frames to form a corner reflector is shown in FIGURE 4. This assembly is shown as a four-corner reflector and is formed from the larger size frames of FIGURE 3 together with the smaller size frames of FIGURES 1 and 2. A larger size frame 20 which, for convenience, will be described as being in the vertical plane, is arranged with its larger side adjacent the larger sides of two horizontally arranged larger size frames 21 and 22, the frame 22 being shown dotted as it lies behind the frame 20 in the perspective view of the drawing. A smaller size frame 23 is secured with its right angle apex at the centres of the longer sides of the frames 20, 21 and with its other two apices adjacent the right angled apices of the frames 20 and 21 respectively. Similarly a further small size frame 24, which is shown dotted as it lies behind frame 21, is secured in the corresponding position between the frames 20 and 22. The various frames are secured together by spring clips. It will be seen that the larger size frames have their longer sides parallel to one another and these may be secured together at their ends, and, if necessary, at their centres by simple C-shaped clips which are clipped over the wires forming the frames. For this particular purpose the clips would have to embrace three wires and it will be appreciated that clips of various sizes may be provided suitable for embracing appropriate numbers of wires in constructing various other assemblies of these frames. To secure the 45° corners of the smaller frames in position, a special form of clip illustrated in FIGURES 6 and 7 is employed. It will be seen that this clip has four arms 39, 31, 32, 33 which, as shown in FIGURE 7, are each bent to form a U-shaped channel adapted to embrace single wire of a frame. One pair of oppositely directed arms of the clip, e.g. the arms 31, 33, may be arranged to embrace the wire of frame 21, for example, on either side of its 90° apex and the other two arms 30, 32 would be bent over to embrace respectively the two portions of the wire of frame 23 on either side of its 45° apex. The smaller frames 23, 24 can be secured by C-shaped spring clips to the projecting portions 25, 26 extending from the centres of the longer sides of the frames 20, 21 respectively.

It will be immediately apparent that an octahedral corner reflector can be built up from the arrangement of FIGURE 4 by arranging a further larger frame in a vertical plane in its longer side lying parallel to and adjacent the longer sides of the frames 20, 21, 22 and with its apex vertically above the centres of these longer sides. This octahedral corner reflector is then completed by two smaller frames arranged on the upper sides of the frames 21, 22 in positions corresponding to the frames 23, 24.

A larger sized four-corner reflector may be constructed as shown in FIGURE 5 from eight larger sized frames, that is to say eight of the frames shown in FIGURE 3. It will be seen that four such frames 40, 41, 42 and 43 are arranged in a plane (assumed hereinafter to be a horizontal plane) with their right angled apices together. The other four frames 44, 45, 46 and 47 are then arranged in two vertical planes at right angles to form a four-corner reflector, these four frames 44–47 having one of their shorter sides extending vertically downwards from the right angle apices of the other four frames. In this arrangement, the frames may be clipped together by simple C-shaped clips. It will be immediately apparent that the arrangement of FIGURE 5 may be extended to form an octahedral corner reflector by arranging four further similar frames on the upper side of the plane formed by frames 40–43, these four further frames being arranged in a vertical plane and mutually at right angles to one another.

The corner reflectors described above may be assembled with frames having different reflecting materials for different surfaces, for example, the horizontal surfaces might be formed of mesh so as to minimise air resistance to lifting as the reflector is carried upwards by a balloon whilst the vertical surfaces, which are particularly important as reflecting surfaces if the reflector is at a long range and at a low angle of elevation, may be made of foil or metalized paper which is a better and cheaper reflecting surface.

We claim:

1. A corner reflector comprising a number of flat reflecting elements secured together mutually at right angles, each reflecting element comprising a frame of resilient material extending around the periphery of the element and a sheet of flexible reflecting material with its marginal portions secured on the frame, the frame being shaped with sides tending to bow outwardly so that, due to the resilience of the frame, it tensions the material outwardly along substantially the whole length of the peripheral edges of the sheet, the sheet of flexible reflecting material being arranged on the frame to hold the latter in the form of a triangular element with two straight sides at right angles to one another.

2. A corner reflector comprising a number of flat reflecting elements secured together mutually at right angles, each reflecting element comprising a frame of resilient material extending around the periphery of the element and a sheet of flexible reflecting material with its marginal portions secured on the frame, the frame being shaped with sides tending to bow outwardly so that, due to the resilience of the frame, it tensions the material outwardly along substantially the whole length of the peripheral edges of the sheet, the sheet of flexible reflecting material being arranged on the frame to hold the latter in the form of a straight-sided right-angled isosceles triangular element.

3. A corner reflector comprising a plurality of independently flat reflecting elements and clips securing the elements together, each element being of right-angled isosceles form and formed of a peripheral frame of resilient material and a sheet of flexible reflecting material with its marginal portions secured on the frame, the frame being shaped with sides tending to bow outwardly but held straight by the tension of said flexible reflecting material to form a flat reflecting element which is rigid in its own plane, the reflecting elements being secured by said clips holding the frames together with the elements in three planes mutually at right angles to one another, the planes intersecting at a common point.

4. A corner reflector comprising a number of separate flat reflecting elements of substantially right angled isosceles triangular form secured together mutually at right angles, each reflecting element comprising a resilient frame extending around the periphery of the element and a sheet of flexible reflecting material secured on said frame along the sides thereof, the frame being of substantially triangular form with sides which tend to bow outwardly due to the resilience of the frame material but which are held straight by the flexible sheet whereby the latter is kept flat under tension by the frame, the reflecting elements being of two different sizes of which the larger size elements have their shorter sides substantially equal in length to the larger side of each smaller element and the frame of each larger size element having, at the center of the larger side, a part projecting towards the opposite apex of the frame.

5. A corner reflector comprising a plurality of separate substantially triangular elements, each element comprising a peripheral frame and a sheet of flexible reflecting material secured on the frame to be maintained taut thereby, the elements being of right-angled isosceles form with elements of two sizes of which the larger size has its shorter sides substantially equal in length to the larger side of the smaller elements, each larger size element having, at the center of the larger side, a part of the frame projecting towards the opposite apex, and clips arranged to secure the elements together in three mutually orthogonal planes.

References Cited in the file of this patent

UNITED STATES PATENTS

| | | |
|---|---|---|
| 770,626 | Bell | Sept. 20, 1904 |
| 1,489,880 | Dervey | Apr. 18, 1924 |
| 1,594,951 | Headding et al. | Aug. 3, 1926 |
| 2,423,648 | Hansell | July 8, 1947 |
| 2,450,417 | Bossi | Oct. 5, 1948 |
| 2,470,416 | Silver | May 17, 1949 |
| 2,471,828 | Mautner | May 31, 1949 |
| 2,639,426 | McAuley et al. | May 19, 1953 |
| 2,643,711 | Smith | June 30, 1953 |
| 2,702,900 | Matson | Feb. 22, 1955 |
| 2,798,478 | Tarcici | July 9, 1957 |
| 2,888,675 | Pratt et al. | May 26, 1959 |
| 2,912,687 | Leonard | Nov. 10, 1959 |

FOREIGN PATENTS

| | | |
|---|---|---|
| 717,034 | Germany | Feb. 4, 1942 |
| 683,649 | Great Britain | Dec. 3, 1952 |
| 718,516 | Great Britain | Nov. 17, 1954 |
| 719,481 | Great Britain | Dec. 1, 1954 |
| 727,512 | Great Britain | Apr. 16, 1955 |